(12) United States Patent
Horino et al.

(10) Patent No.: US 7,407,333 B2
(45) Date of Patent: Aug. 5, 2008

(54) OPTICAL FIBER FIXING SYSTEM, OPTICAL FIBER BUTTING SYSTEM AND OPTICAL FIBER FUSION-SPLICING SYSTEM

(75) Inventors: Seiji Horino, Yachiyo (JP); Kensuke Yoshida, Sakura (JP); Noriyuki Kawanishi, Yachiyo (JP)

(73) Assignee: Fujikura Ltd., Tokyo (JP)

( * ) Notice: Subject to any disclaimer, the term of this patent is extended or adjusted under 35 U.S.C. 154(b) by 225 days.

(21) Appl. No.: 10/798,422

(22) Filed: Mar. 12, 2004

(65) Prior Publication Data
US 2004/0179794 A1 Sep. 16, 2004

(30) Foreign Application Priority Data
Mar. 14, 2003 (JP) ............................ P2003-070077

(51) Int. Cl.
*G02B 6/255* (2006.01)
(52) U.S. Cl. ..................... 385/98; 385/137; 385/83
(58) Field of Classification Search ............ 385/88–99, 385/100, 124, 125, 126, 147
See application file for complete search history.

(56) References Cited

U.S. PATENT DOCUMENTS

| | | | |
|---|---|---|---|
| 4,276,113 A | * | 6/1981 | Carlsen et al. ............... 156/502 |
| 4,812,010 A | * | 3/1989 | Osaka et al. .................. 385/96 |
| 5,717,813 A | * | 2/1998 | Harman et al. ............... 385/147 |
| 5,993,070 A | * | 11/1999 | Tamekuni et al. ............. 385/65 |
| 6,203,213 B1 | * | 3/2001 | Seo et al. ...................... 385/96 |
| 6,377,743 B1 | * | 4/2002 | Ueda et al. ................... 385/137 |
| 6,435,733 B1 | * | 8/2002 | Parat et al. .................... 385/88 |
| 6,553,173 B1 | * | 4/2003 | Goto ........................... 385/137 |
| 6,655,433 B1 | * | 12/2003 | Hirayama et al. ........... 156/436 |
| 7,079,725 B2 | * | 7/2006 | Sherrer et al. ................. 385/16 |

FOREIGN PATENT DOCUMENTS

| | | | | |
|---|---|---|---|---|
| JP | 01013505 A | * | 1/1989 | |
| JP | 6-258541 A | | 9/1994 | |
| JP | 2003014974 A | * | 1/2003 | |
| JP | 2004004350 A | * | 1/2004 | |

* cited by examiner

*Primary Examiner*—Hemang Sanghavi
*Assistant Examiner*—Omar Rojas
(74) *Attorney, Agent, or Firm*—Sughrue Mion, PLLC

(57) ABSTRACT

An optical fiber fixing system includes a clamp base and a clamp member. The clamp base has a V-groove on a top surface thereof. The depth of the V-groove is configured such that a ridgeline of an optical fiber projects beyond the top surface of the base when the optical fiber is mounted therein. The clamp member has a protrusion on a bottom surface thereof. The protrusion depresses, from the upside, the optical fiber mounted in the V-groove of the clamp base. Further, the protrusion is configured to extend substantially perpendicularly to the axial direction of the optical fiber.

49 Claims, 10 Drawing Sheets

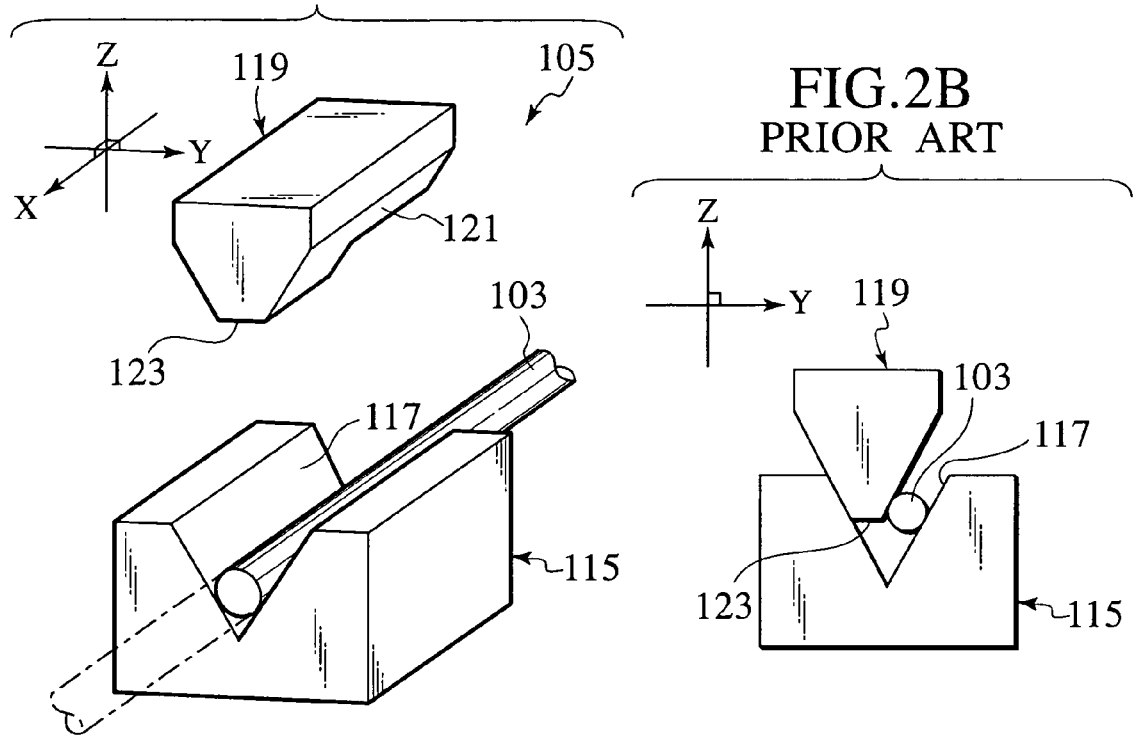
FIG.2A PRIOR ART
FIG.2B PRIOR ART
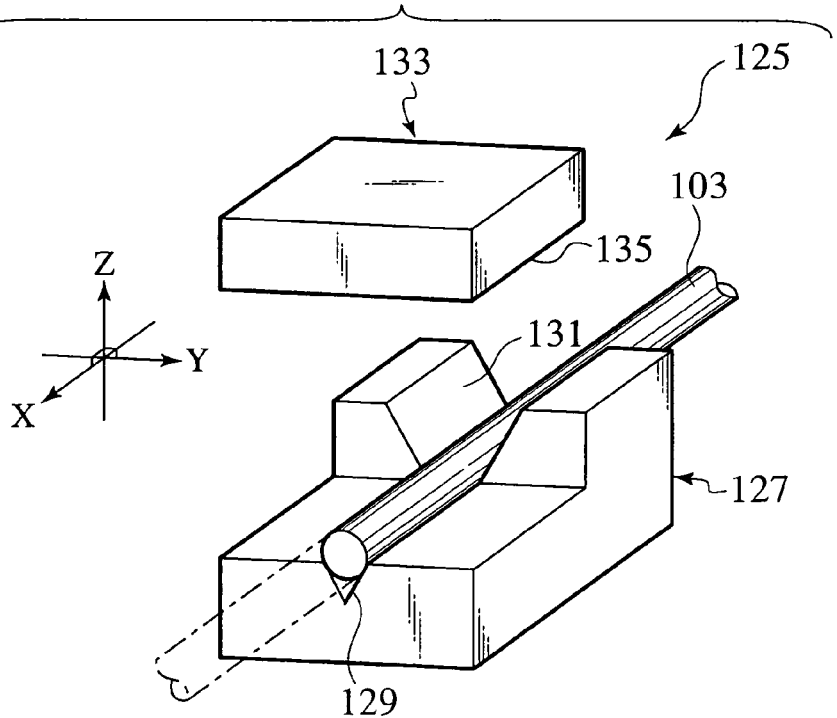
FIG.3 PRIOR ART

OPTICAL FIBER FIXING SYSTEM, OPTICAL FIBER BUTTING SYSTEM AND OPTICAL FIBER FUSION-SPLICING SYSTEM

CROSS REFERENCE TO RELATED APPLICATIONS

This application claims benefit of priority to Japanese Patent Application No. 2003-070077 filed on Mar. 14, 2003 in the Japanese Patent Office, the entire contents of which are herein incorporated by reference.

BACKGROUND OF THE INVENTION

1. Field of the Invention

The present invention relates to an optical fiber butting system for butting two optical fibers against each other and an optical fiber fusion-splicing system for fusion-splicing two optical fibers, and more particularly, to an optical fiber fixing system for fixing each optical fiber before butting or fusion-splicing the two optical fibers.

2. Description of the Related Art

An optical fiber fixing system for fixing an optical fiber is used for an optical fiber butting system (an optical fiber alignment system) or an optical fiber fusion-splicing system. As an optical fiber fusion-splicing system according to the related art, known is one disclosed in Japanese Patent Publication Laid-Open No. 6-258541. As shown in FIG. 1, an optical fiber fusion-splicing system 101 includes optical fiber fixing systems 105, 105, an optical fiber butting section 107, discharge electrodes 109, 109, a system main body 111, a windshield cover 113, a hinge portion 114, and a monitor (not shown in the figure). Moreover, in FIG. 1, an X-axis, a Y-axis and a Z-axis are set respectively in the lateral, longitudinal and vertical directions of the system main body 111. Further, in FIGS. 2A, 2B and 3, an X-axis, a Y-axis and a Z-axis are set respectively in the longitudinal, lateral and vertical directions of the optical fiber fixing system 105 (125). The X-axis, Y-axis and Z-axis are perpendicular to one another.

The optical fiber fixing systems 105, 105 are disposed respectively along the X-axis at the equal distances from the butting section 107. The optical fiber fixing systems 105, 105 fix the optical fibers 103, 103 respectively. The discharge electrodes 109, 109 are disposed respectively along the Y-axis at the equal distances from the butting section 107. The discharge electrodes 109, 109 are used for fusing the end surfaces of the optical fibers 103, 103. The windshield cover 113 is configured such that it may be opened and shut around the hinge portion 114 attached to the +Y side portion of the system main body 111, and protects the butting section 107. The monitor is disposed on the side of the system main body 111.

Parenthetically, an optical fiber butting system includes the components of the optical fiber fusion-splicing system 101 except for the discharge electrodes 109, 109, and is a system for butting the optical fibers 103, 103 to align them with each other.

The optical fiber fixing system 105 is, as shown in FIG. 2A, includes a clamp base 115 and a clamp member 119. FIG. 2A shows the optical fiber fixing system 105, which has been shown on the −X side in FIG. 1. Further, the optical fiber fixing system 105 shown on the +X side in FIG. 1 has the same configuration as that in FIG. 2A. The clamp base 115 has, on its top surface, a V-groove 117 for mounting the optical fiber 103 and is attached to the system main body 111. The depth of the V-groove 117 is designed so that a ridgeline of the optical fiber 103 may be located within the V-groove 117. The clamp member 119 has a protrusion 123 on the bottom surface of its +X side end portion. Slopes 121, 121 are formed on both sides of the protrusion 123 and are fitted into the V-groove 117. When the optical fiber 103 is fixed using the optical fiber fixing system 105, the optical fiber 103 is arranged along the V-groove 117 and then the optical fiber 103 is depressed against the V-groove 117 using the clamp member 119. The clamp member 119 is usually made of a resin so as not to damage the optical fiber 103.

However, the optical fiber fixing system 105 has the following two problems. The first one is that the clamp member 119 has a poor anti-abrasion characteristic since the clamp member 119 is made of a resin. The second one is that the optical fiber 103 is liable to be off the bottom surface of the protrusion 123 as shown in FIG. 2B since the protrusion 123 of the clamp member 119 is not configured so as to guide the optical fiber 103 to the bottom portion of the V-groove 117.

Alternatively to the optical fiber fixing system 105, an optical fiber fixing system 125 has been developed. The optical fiber fixing system 125 includes, as shown in FIG. 3, a clamp base 127 and a clamp member 133. The clamp base 127 has, on its top surface, a first V-groove 129 and a second V-groove 131 for mounting an optical fiber 103, and is attached to a system main body 111. The depth of the first V-groove 129 is designed so that a ridgeline of the optical fiber 103 may be located above the first V-groove 129. The depth of the second V-groove 131 is designed so that the ridgeline of the optical fiber 103 may be located within the second V-groove 131. A bottom surface 135 of the clamp member 133 has the shape of a plane. When the optical fiber 103 is fixed using the optical fiber fixing system 125, the optical fiber 103 is mounted in along the first V-groove 129 and the second V-groove 131, and then the ridgeline of the optical fiber 103, which projects over the first V-groove, is depressed against the first V-groove 129 using the clamp member 133. At that time, the second V-groove 131 restricts the movement of the optical fiber 103 in the direction of Y-axis. The bottom surface 135 of the clamp member 133 goes down maintaining to be parallel to the X-Y plane and contacts the ridgeline of the optical fiber 103. Usually, the clamp member 133 is made of a ceramic in order to reduce friction with the optical fiber 103.

However, the optical fiber fixing system 125 has the following two problems. The first one is that it is difficult to set easily the optical fiber 103 on the clamp base 127 since the first V-groove is formed to be longer than the second V-groove along the axial direction of the optical fiber 103. The second one is that the clamp member 133 is likely to become expensive and is liable to damage the surface of the optical fiber 103 since the clamp member 133 is made of a ceramic.

SUMMARY OF THE INVENTION

The object of the present invention is to provide, in order to improve the mechanism of fixing an optical fiber, an optical fiber fixing system having a clamp member which realizes enhancement of an anti-abrasion characteristic, prevention against getting out of clamping, lowering the price and prevention against damaging the surface of the optical fiber, an optical fiber butting system including the optical fiber fixing system, and an optical fiber fusion-splicing system including the optical fiber fixing system.

In order to achieve the above object, the present invention provides an optical fiber fixing system for fixing an optical fiber comprising: a fixing body comprising a first groove, formed in a first surface thereof, extending in a first direction to support the optical fiber along its axial direction; and a pressing body comprising a protrusion, formed on a first surface thereof, and extending substantially perpendicularly to the first groove, wherein the first surface of the pressing body faces the first surface of the fixing body.

According to the present invention, since the protrusion extends substantially perpendicularly to the axial direction of the optical fiber, a contact area between the protrusion and the optical fiber turns small. Therefore, prevention against damaging the surface of the optical fiber is achieved due to the decrease in friction occurring between the pressing body and the optical fiber.

In order to achieve the above object, the present invention provides an optical fiber butting system, which is provided with a pair of optical fiber fixing systems as the above-recited, for respectively fixing a pair of optical fibers set up at an equal distance from a butting section, for butting the optical fibers fixed to the optical fiber fixing systems.

According to the present invention, since the protrusion extends substantially perpendicularly to the axial direction of the optical fiber, a contact area between the protrusion and the optical fiber turns small. Therefore, prevention against damaging the surface of the optical fiber is achieved due to the decrease in friction occurring between the pressing body and the optical fiber.

In order to achieve the above object, the present invention provides an optical fiber fusion-splicing system, which is provided with a pair of optical fiber fixing systems as the above-recited, for respectively fixing a pair of optical fibers set up at an equal distance from a butting section by fusion-splicing the optical fibers fixed to the optical fiber fixing systems.

According to the present invention, since the protrusion extends substantially perpendicularly to the axial direction of the optical fiber, a contact area between the protrusion and the optical fiber turns small. Therefore, prevention against damaging the surface of the optical fiber is achieved due to the decrease in friction occurring between the pressing body and the optical fiber.

In order to achieve the above object, the present invention provides an optical fiber fixing system for fixing an optical fiber comprising: a fixing body comprising a first groove formed in a first surface thereof, and a second groove formed in a second surface thereof, both extending in a first direction to support the optical fiber along its axial direction; and a pressing body comprising a planar clamp portion facing the first surface of the fixing body, and a guide portion facing the second surface of the fixing body and comprising two sloped portions configured to interface with the second groove to align the optical fiber therein.

According to the present invention, when the optical fiber is set in along the first groove and the second groove, the optical fiber can be set with ease on the first surface and the second surface of the fixing body since the optical fiber is guided to the first groove by the second groove. Further, even if the optical fiber gets stuck in the second groove to be in danger of getting out of clamping, prevention against getting out of the clamping will be achieved since the pressing body guides the optical fiber to the bottom portion of the first groove.

In order to achieve the above object, the present invention provides an optical fiber butting system, which is provided with a pair of optical fiber fixing systems as the above-recited, for respectively fixing a pair of optical fibers set up at an equal distance from a butting section, for butting the optical fibers fixed to the optical fiber fixing systems.

According to the present invention, when the optical fiber is set in along the first groove and the second groove, the optical fiber can be set with ease on the first surface and the second surface of the fixing body since the optical fiber is guided to the first groove by the second groove. Further, even if the optical fiber gets stuck in the second groove to be in danger of getting out of clamping, prevention against getting out of the clamping will be achieved since the pressing body guides the optical fiber to the bottom portion of the first groove.

In order to achieve the above object, the present invention provides an optical fiber fusion-splicing system, which is provide with a pair of optical fiber fixing systems as the above-recited, for respectively fixing a pair of optical fibers set up at an equal distance from a butting section by fusion-splicing the optical fibers fixed to the optical fiber fixing systems.

According to the present invention, when the optical fiber is set in along the first groove and the second groove, the optical fiber can be set with ease on the first surface and the second surface of the fixing body since the optical fiber is guided to the first groove by the second groove. Further, even if the optical fiber gets stuck in the second groove to be in danger of getting out of clamping, prevention against getting out of the clamping will be achieved since the pressing body guides the optical fiber to the bottom portion of the first groove.

BRIEF DESCRIPTION OF THE DRAWINGS

These and other objects, features and advantages will become clearer from the following description of exemplary embodiments of the invention, read in connection with the accompanying drawings in which:

FIG. 2A is a perspective view of an optical fiber fixing system according to the related art;

FIG. 2B is an illustrative diagram showing a state where an optical fiber is out of a bottom surface of a clamp member;

FIG. 3 is a perspective view of an optical fiber fixing system according to another related art;

DESCRIPTION OF THE EXEMPLARY EMBODIMENTS

Referring to FIGS. 4 to 13, the first to fourth exemplary embodiments of the present invention will be explained. The described exemplary embodiments are intended to assist the understanding of the invention, and are not intended to limit the scope of the invention in any way.

Additionally, in FIGS. 4 to 13, an X-axis, a Y-axis and a Z-axis are set respectively in the longitudinal, lateral and vertical directions of an optical fiber fixing system. Further, an X-axis, a Y-axis and a Z-axis are set respectively in the lateral, longitudinal and vertical directions of an optical fusion-splicing system and an optical fiber butting system. The X-axis, Y-axis and Z-axis are respectively perpendicular to one another.

First Exemplary Embodiment

Figure 1:
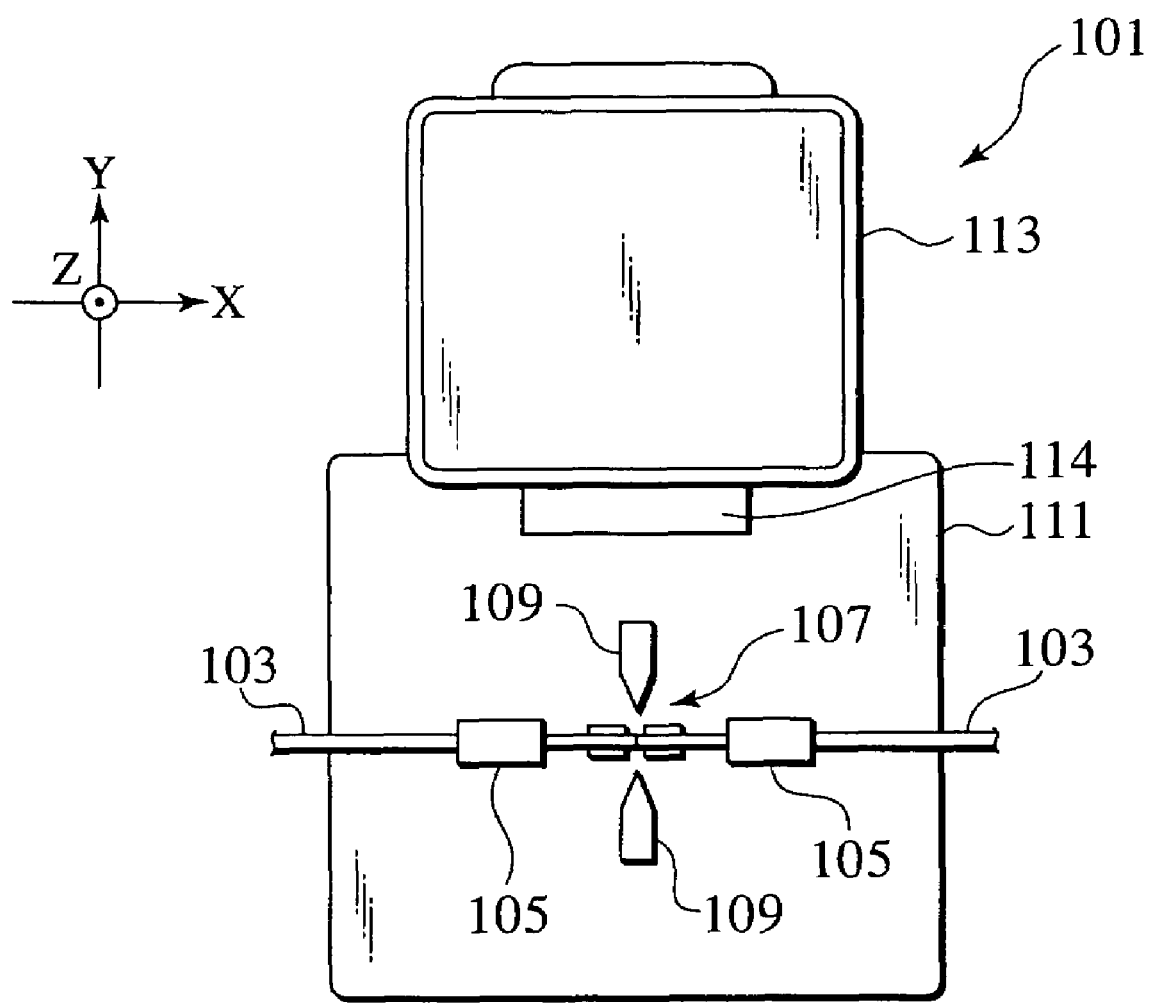
FIG. 1 is a plane view of an optical fiber fusion-splicing system according to the related art in a state where a windshield cover is open.
Figure 4:
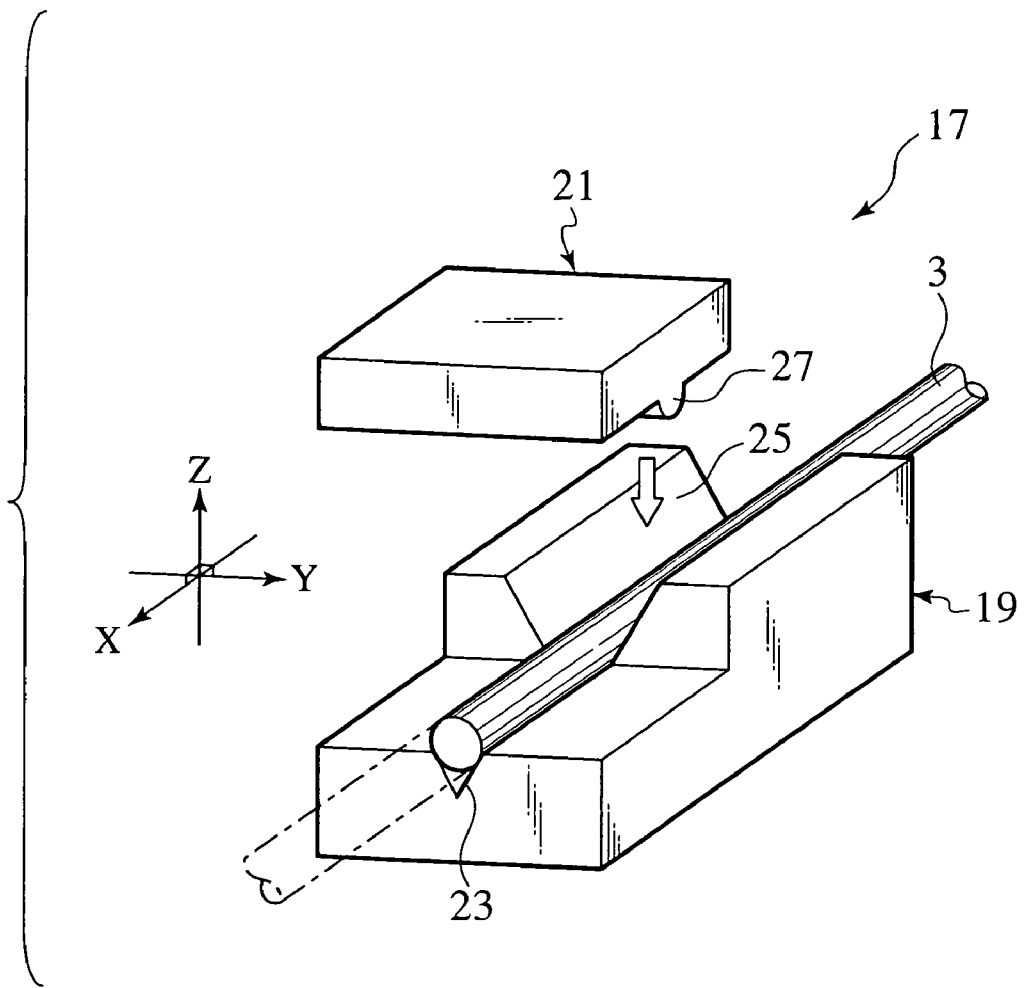
FIG. 4 is a perspective view of an optical fiber fixing system according to a first exemplary embodiment of the present invention.

An optical fiber fixing system 17 includes, as shown in FIG. 4, a clamp base 19 and a clamp member 21. The clamp base 19 is a fixing body for fixing an optical fiber 3 thereon. The clamp member 21 is a pressing body for depressing the optical fiber 3 against the clamp base 19.

A first V-groove 23 and a second V-groove 25 are formed along the X-axis on the top surface of the clamp base 19. The first V-groove 23 is shorter relative to the second V-groove 25. The depth of the first V-groove 23 is designed so that a ridgeline of the optical fiber 3 may be located above the first V-groove 23. The depth of the second V-groove 25 is designed so that the ridgeline of the optical fiber 3 may be located within the second V-groove 25. The second V-groove 25 guides the optical fiber 3 to the first V-groove 23 when the optical fiber 3 is mounted on the top surface of clamp base 19.

A bottom surface of the clamp member 21 is parallel to an X-Y plane. A semi-cylindrical protrusion 27 is integrally provided in the central portion of the bottom surface of the clamp member 21 and is extending along the Y-axis from one end to the other end of the clamp member 21. When the optical fiber 3 is fixed using the optical fiber fixing system 17, the optical fiber 3 is mounted in along the first V-groove 23 and the second V-groove 25, and then the ridgeline of the optical fiber 3, which projects over the first V-groove 23, is depressed against the first V-groove 23 using the protrusion 27 of the clamp member 21. At that time, the second V-groove 25 restricts the movement of the optical fiber 3 in the direction of Y-axis.

Additionally, the number of protrusions 27 on the bottom surface of clamp member 21 is not necessarily limited to one but a plurality of them can be provided in the X-axis direction parallel to the Y-axis.

The optical fiber fixing system 17 is characterized by the following.

When the optical fiber 3 is positioned in the first V-groove 23 and the second V-groove 25 of the clamp base 19, the optical fiber 3 is positioned with ease in the first V-groove 23 because the first V-groove 23 is shorter than the second V-groove 25 and also because the optical fiber 3 is guided by the second V-groove 25 to the first V-groove 23.

Even if the optical fiber 3 gets stuck in the second V-groove 25 to be in danger of getting out of clamping, prevention against getting out of the clamping will be achieved since the protrusion 27 of the clamp member 21 guides the optical fiber 3 to the bottom portion of the first V-groove 23.

Figure 5:
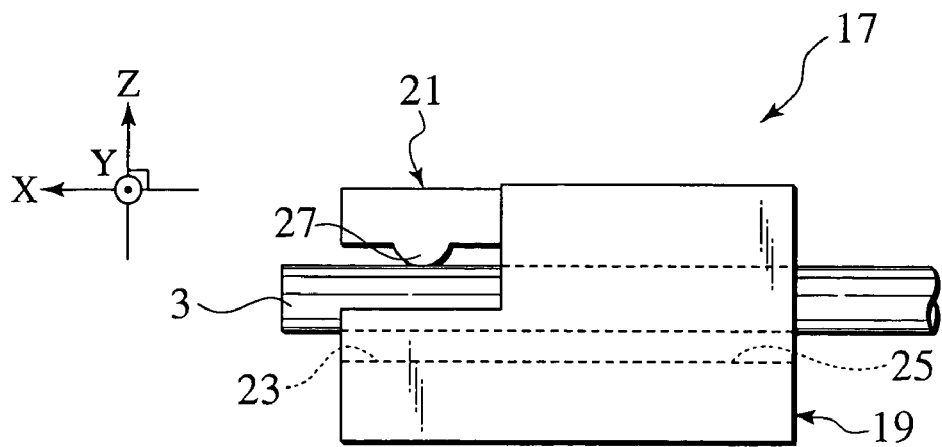
FIG. 5 is a side view of the optical fiber fixing system according to the first exemplary embodiment of the present invention.

Since the protrusion 27 extends approximately perpendicularly (Y-axis direction) to the axial direction (X-axis direction) of the optical fiber 3, the contact area between the protrusion 27 and the optical fiber 3 turns small, as shown in FIG. 5, when the protrusion 27 contacts with the optical fiber 3. Therefore, damaging the surface of the optical fiber is prevented due to the decrease in friction occurring between the protrusion 27 and the optical fiber 3.

If the clamp member 21 is made of a ceramic, the tip of the protrusion 27 never wears down.

Moreover, by changing the profiles of the first V-groove 23 and the second V-groove 25 into the shape of a trapezoid from the shape of a V, the clamp member 21 can be employed even when an optical fiber ribbon with multiple core fibers is fixed on the top surface of the clamp base 19.

Although the protrusion is integrally formed on the bottom surface of the clamp member 21 in the present embodiment, a manner in which a protrusion is formed on a clamp member should not be limited thereto.

Next, first and second modifications of the present embodiment will be explained.

Figure 6A:
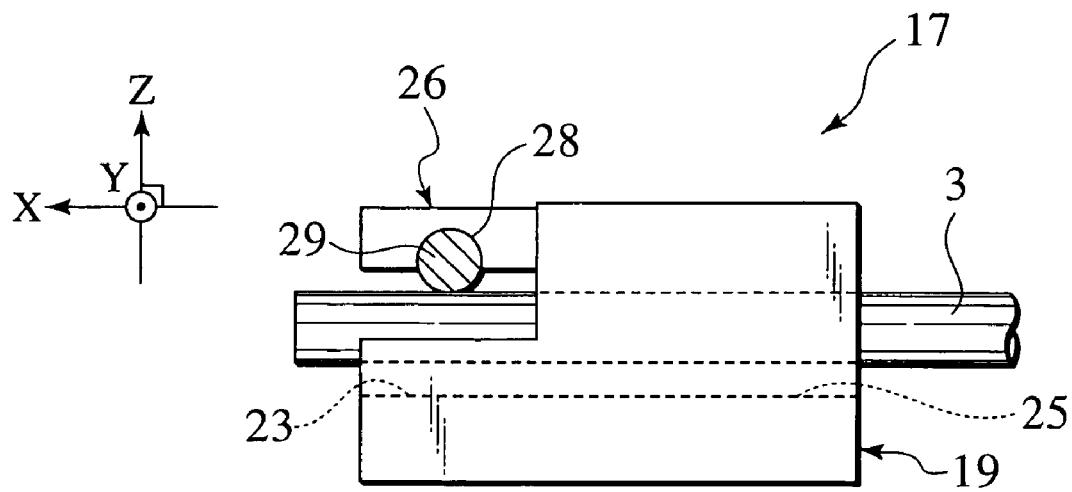
FIG. 6A is a side view of an optical fiber fixing system according to a first exemplary modification of the first exemplary embodiment.

In the first modification of the present embodiment, as shown in FIG. 6A, a groove 28 in the cross sectional shape of a semicircle is formed in the central portion of the bottom surface of the clamp member 26 along the Y-axis from one end to the other end of clamp member 26, and a cylindrical protrusion 29 made of a metal or a ceramic is inlayed into the groove 28 of the clamp member 26. The clamp member 26 is desirably made of a resin. Further, the number of grooves 28 and protrusions 29 on the bottom surface of clamp member 26 is not necessarily limited to one but a plurality of them can be provided in the X-axis direction parallel to the Y-axis.

Figure 6B:
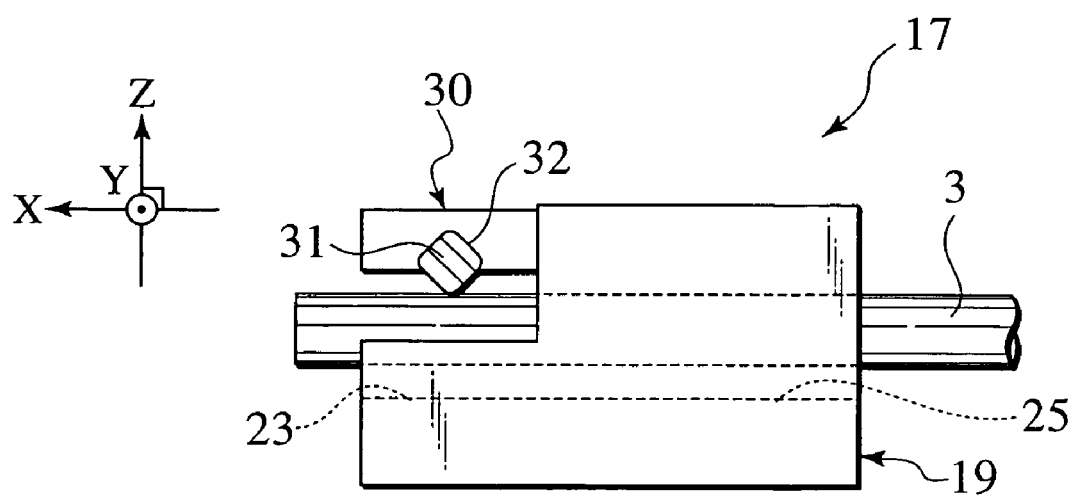
FIG. 6B is a side view of an optical fiber fixing system according to a second exemplary modification of the first exemplary embodiment.

In the second modification of the present embodiment, as shown in FIG. 6B, a groove 32 in the cross sectional shape of a quasi-triangle is formed in the central portion of the bottom surface of the clamp member 30 along the Y-axis from one end to the other end of clamp member 30, and a prismatic protrusion 31 made of a metal or a ceramic is inlayed into the groove 32 of the clamp member 30. The clamp member 30 is desirably made of a resin. Further, the number of grooves 32 and protrusions 31 on the bottom surface of clamp member 30 is not necessarily limited to one but a plurality of them can be provided in the X-axis direction parallel to the Y-axis.

The optical fiber fixing systems 17 relating to the first and second modifications are further characterized by the following.

The protrusions 29, 31 made of a metal or a ceramic are superior in anti-abrasion characteristic to those made of a resin. The clamp members 26, 30 are low in price because they are made of a resin. The protrusions 29, 31 made of a metal far rarely damage the surface of the optical fiber 3 comparing with the protrusions 29, 31 made of a ceramic.

Second Exemplary Embodiment

Figure 7:
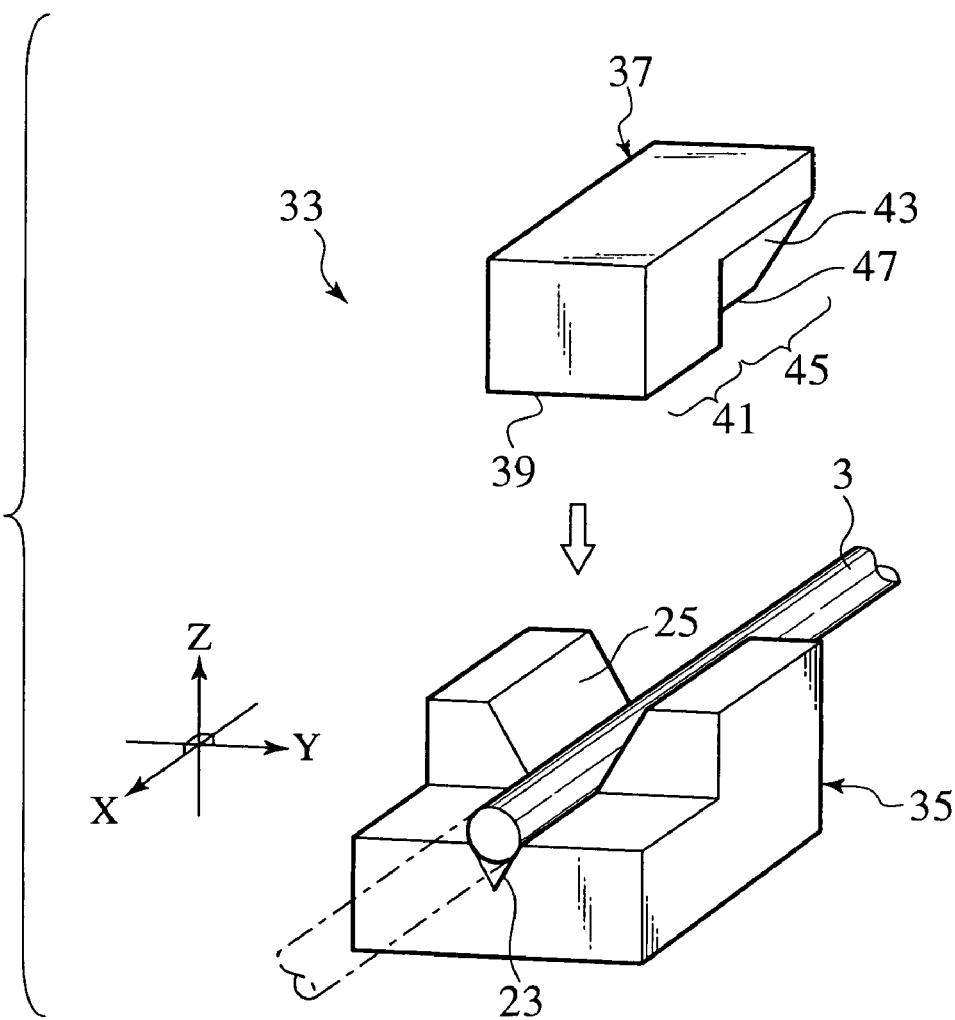
FIG. 7 is a perspective view of an optical fiber fixing system according to a second exemplary embodiment of the present invention.

An optical fiber fixing system 33 includes, as shown in FIG. 7, a clamp base 35 and a clamp member 37. The clamp base 35 is a fixing body for fixing an optical fiber 3 thereon. The clamp member 37 is a pressing body for depressing the optical fiber 3 against the clamp base 35.

Since the clamp base 35 has the similar structure to that of the clamp base 19 in the first embodiment, the detailed description thereof will be omitted.

The clamp member 37 comprises a clamp portion 41 and a guide portion 45. The clamp portion 41 depresses from the upside a ridgeline of the optical fiber 3 mounted in along a first V-groove 23. A bottom surface 39 of the clamp portion 41 is parallel to the X-Y plane. The guide portion 45 is integrally formed on the −X side of the clamp portion 41. On both sides of the guide portion 45 formed are slopes 43, 43 to be fitted into a second V-groove 25. A bottom surface 47 of the guide portion 45 does not contact the ridgeline of the optical fiber 3.

The optical fixing system 33 has the following characteristics.

When the optical fiber 3 is positioned in the first V-groove 23 and the second V-groove 25 of the clamp base 35, the optical fiber 3 is positioned with ease in the first V-groove 23 because the first V-groove 23 is shorter than the second V-groove 25 and also because the optical fiber 3 is guided by the second V-groove 25 to the first V-groove 23.

Even if the optical fiber 3 gets stuck in the second V-groove 25 to be in danger of getting out of clamping, prevention against getting out of the clamping will be achieved since the bottom surface 39 of the clamp portion 41 guides the optical fiber 3 to the bottom portion of the first V-groove 23.

Since the slopes 43, 43 of the guide portion 45 are fit into the second V-groove 25, the clamp member 37 can be smoothly inserted into the second V-groove 25.

Because the center of gravity of the clamp member 37 exists on the clamp portion 41 side thereof, most of the weight of the clamp member works on the first V-groove 23 side thereof. Therefore, the clamp member 37 fixes securely the optical fiber 3 on the clamp base 35.

When the clamp member 37 is made of a resin, the surface of the optical fiber 3 is prevented from being damaged and the clamp member 37 comes low in price.

Moreover, by changing the profiles of the first V-groove 23 and the second V-groove 25 into the shape of a trapezoid from the shape of a V, the clamp member 37 can be employed even when an optical fiber ribbon with multiple core fibers is fixed on the top surface of the clamp base 35.

In the present embodiment, although the bottom surface 39 of the clamp member 37 is configured to be parallel to the X-Y plane, the shape of the bottom surface 39 of the clamp member 37 should not be limited to that.

In the following, first to third modifications of the present embodiment will be explained.

Figure 8:
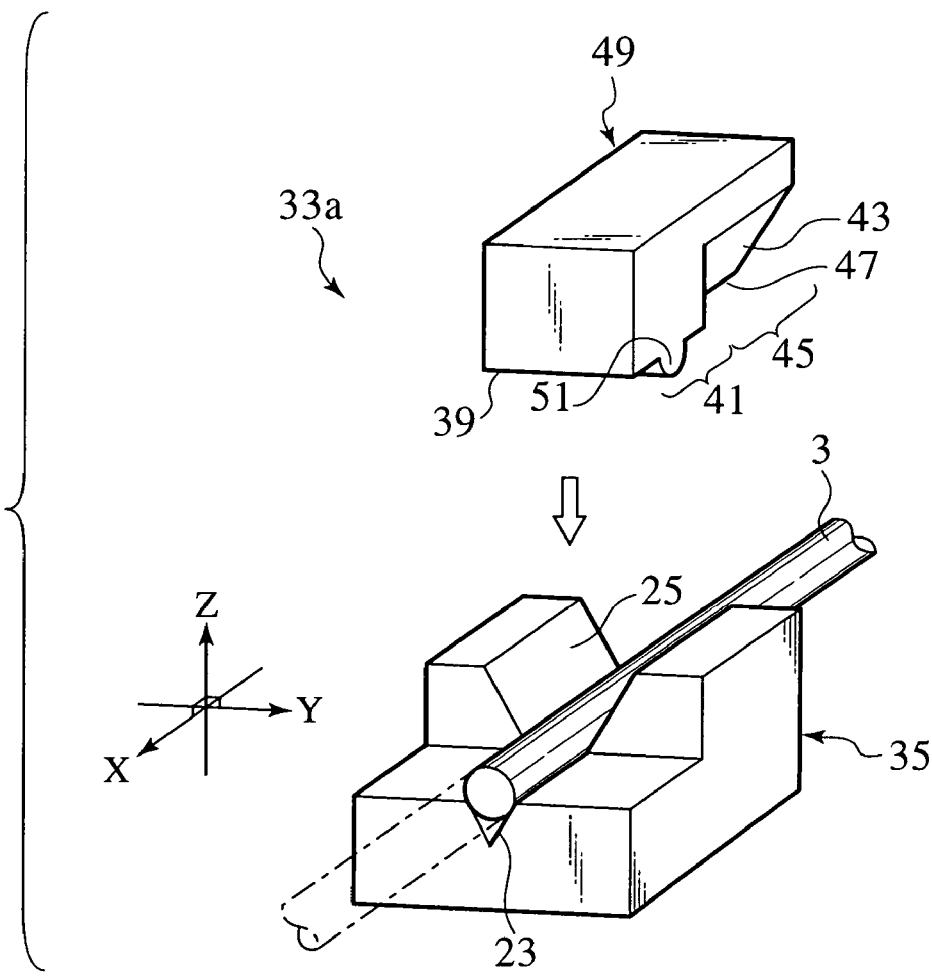
FIG. 8 is a perspective view of an optical fiber fixing system according to a first exemplary modification of the second exemplary embodiment.

In the first modification of the present embodiment, as shown in FIG. 8, a clamp member 49 has a semi-cylindrical protrusion 51 integrally provided on a bottom surface 39 of the clamp portion 41. The protrusion 51 extends on the bottom surface 39 along the Y-axis from one end to the other end of the clamp member 49. When an optical fiber 3 is fixed on a clamp base 35 using the clamp member 49, the optical fiber 3 is mounted in along a first V-groove 23 and a second V-groove 25, and then a ridgeline of the optical fiber 3, which projects over the first V-groove, is depressed against the first V-groove 23 using the protrusion 51 of the clamp member 49. At that time, the second V-groove 25 restricts the movement of the optical fiber 3 in the direction of Y-axis.

Additionally, the number of protrusions 51 on the bottom surface 39 of clamp member 41 is not necessarily limited to one but a plurality of them can be provided in the X-axis direction parallel to the Y-axis.

An optical fiber fixing system 33a relating to the first modification is further characterized by the following.

Even if the optical fiber 3 gets stuck in the second V-groove 25 to be in danger of getting out of clamping in the first V-groove 23, prevention against getting out of the clamping will be achieved since the protrusion 51 of the clamp portion 49 guides the optical fiber 3 to the bottom portion of the first V-groove 23.

Figure 9:
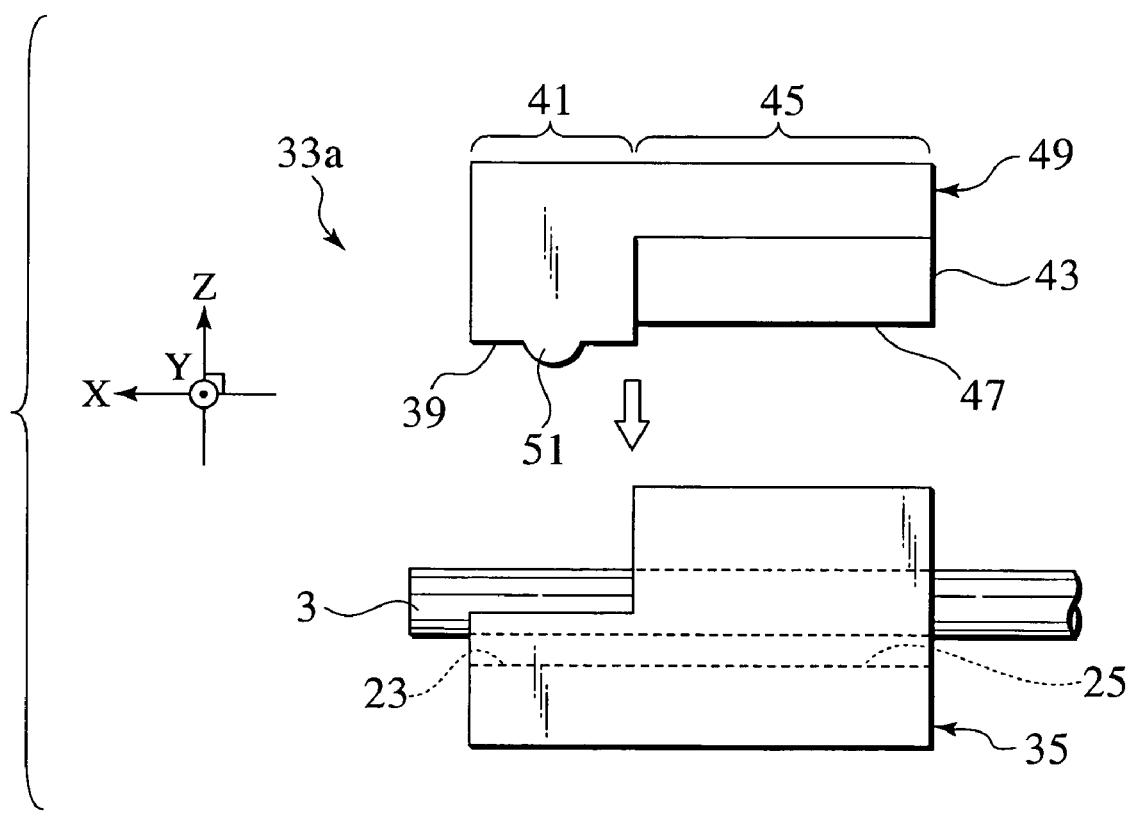
FIG. 9 is a side view of the optical fiber fixing system according to the first exemplary modification of the second exemplary embodiment.

Since the protrusion 51 of the clamp member 49 extends approximately perpendicularly (Y-axis direction) to the axial direction (X-axis direction) of the optical fiber 3, the contact area between the protrusion 51 and the optical fiber 3 turns small, as shown in FIG. 9, when the protrusion 51 contacts with the optical fiber 3. Therefore, damaging the surface of the optical fiber is prevented due to the decrease in friction occurring between the protrusion 51 and the optical fiber 3.

Figure 10A:
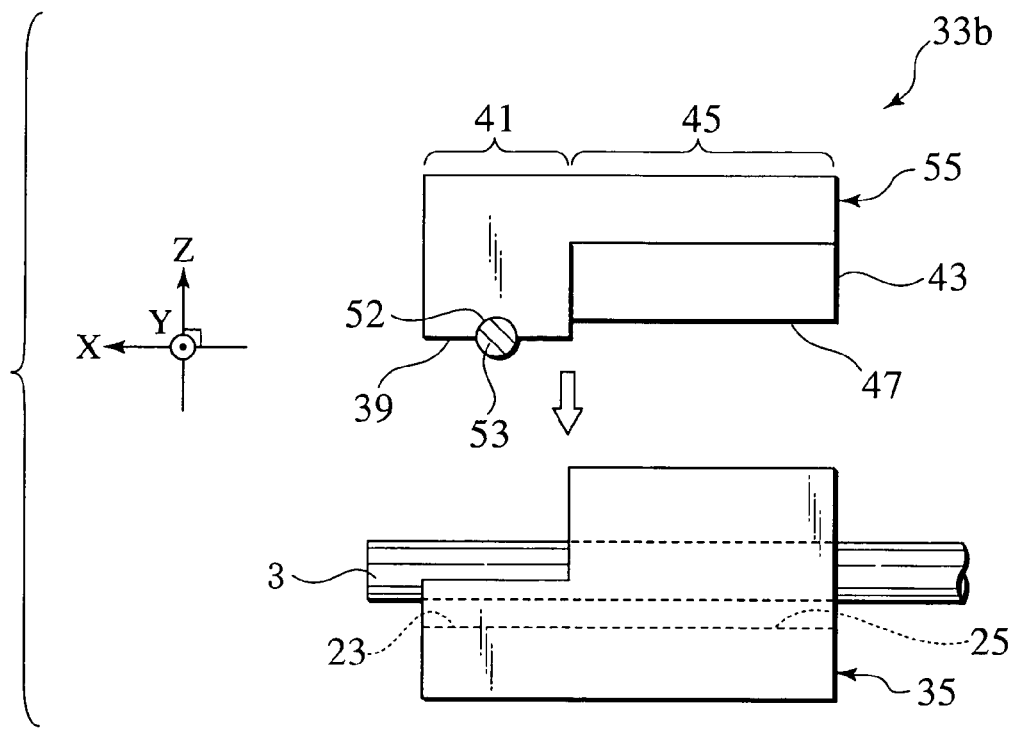
FIG. 10A is a side view of an optical fiber fixing system according to a second exemplary modification of the second exemplary embodiment.

In the second modification of the present embodiment, as shown in FIG. 10A, a groove 52 in the cross sectional shape of a semicircle is formed in the central portion of a bottom surface 39 of a clamp portion 41 along the Y-axis from one end to the other end of the clamp portion 41, and a cylindrical protrusion 53 made of a metal or a ceramic is inlayed into the groove 52 of the clamp portion 41. A clamp member 55 may be made of a resin. When an optical fiber 3 is fixed on a clamp base 35 using the clamp member 55, the optical fiber 3 is mounted in along a first V-groove 23 and a second V-groove 25, and then a ridgeline of the optical fiber 3, which projects over the first V-groove, is depressed against the first V-groove 23 using the protrusion 53 of the clamp member 55. At that time, the second V-groove 25 restricts the movement of the optical fiber 3 in the direction of Y-axis.

Further, the number of grooves 52 and protrusions 53 on the bottom surface 39 of clamp portion 41 is not necessarily limited to one but a plurality of them can be provided in the X-axis direction parallel to the Y-axis.

Figure 10B:
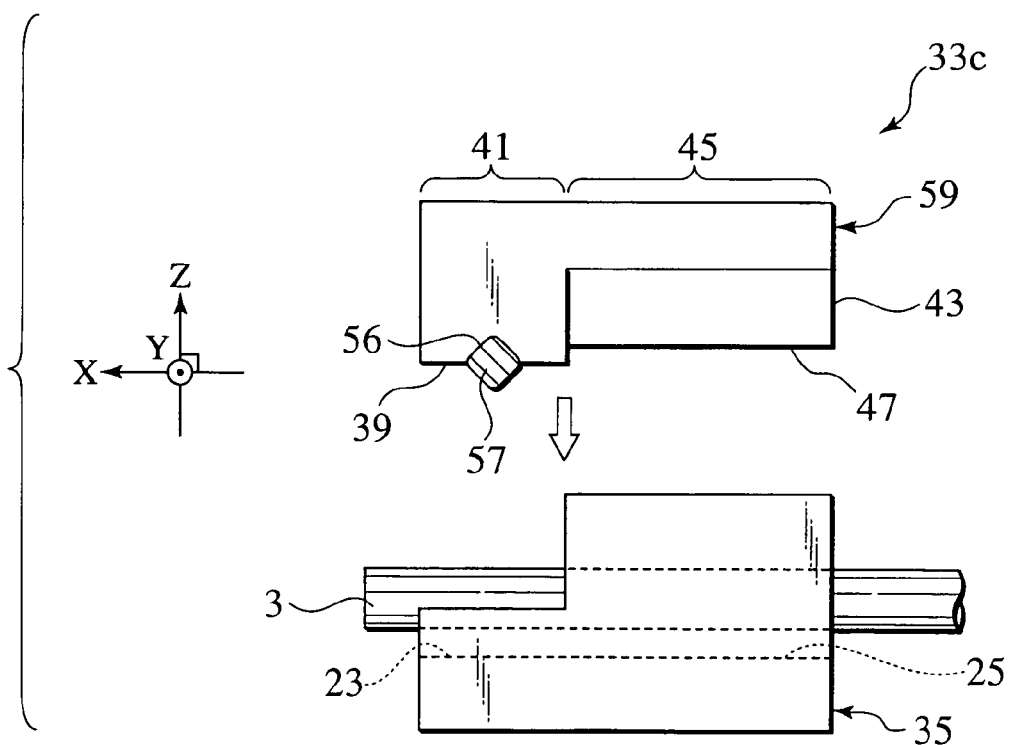
FIG. 10B is a side view of an optical fiber fixing system according to a third exemplary modification of the second exemplary embodiment.

In the third modification of the present embodiment, as shown in FIG. 10B, a groove 56 in the cross sectional shape of a quasi-triangle is formed in the central portion of a bottom surface 39 of a clamp portion 41 along the Y-axis from one end to the other end of the clamp portion 41, and a prismatic protrusion 57 made of a metal or a ceramic is inlayed into the groove 56 of the clamp portion 41. A clamp member 59 may be made of a resin. When an optical fiber 3 is fixed on a clamp base 35 using the clamp member 59, the optical fiber 3 is mounted in along a first V-groove 23 and a second V-groove 25, and then a ridgeline of the optical fiber 3, which projects over the first V-groove, is depressed against the first V-groove 23 using the protrusion 57 of the clamp member 59. At that time, the second V-groove 25 restricts the movement of the optical fiber 3 in the direction of Y-axis.

Further, the number of grooves 56 and protrusions 57 on the bottom surface 39 of clamp portion 41 is not necessarily limited to one but a plurality of them can be provided in the X-axis direction parallel to the Y-axis.

The optical fiber fixing systems 33b and 33c relating to the second and third modifications are characterized by the following.

The protrusions 53, 57 made of a metal or a ceramic are superior in anti-abrasion characteristic to those made of a resin. The clamp members 55, 59 are low in price because they are made of a resin. The protrusion made of a metal far rarely damages the surface of the optical fiber 3 comparing with the protrusion made of a ceramic.

Third Exemplary Embodiment

In this embodiment, an optical fiber fusion-splicing system 1 employing an optical fiber fixing system 17 or an optical fiber fixing system 33 will be described.

Figure 11:
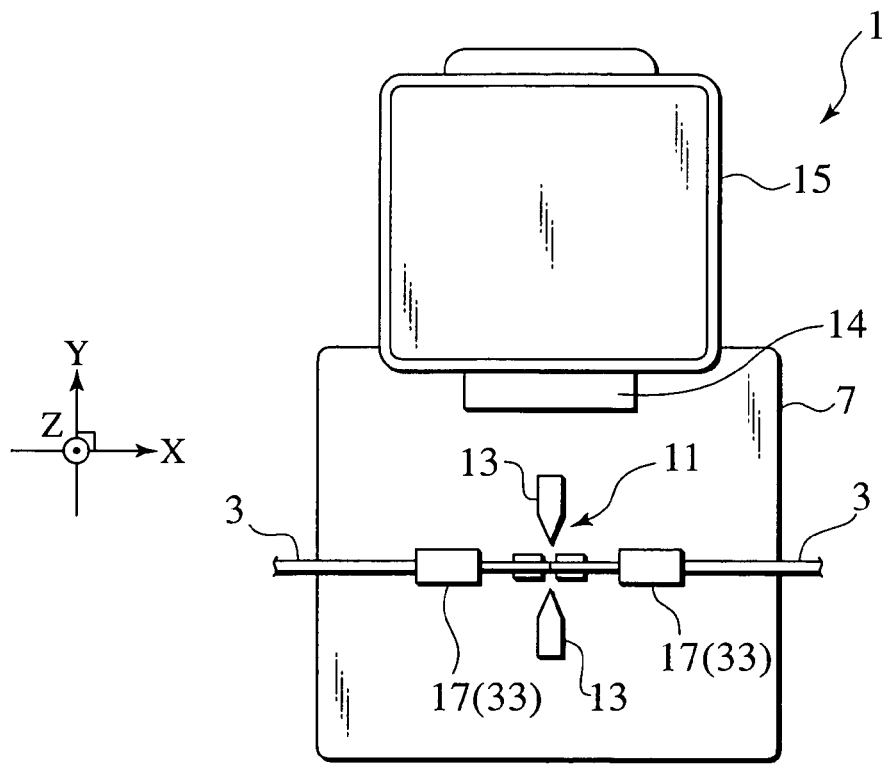
FIG. 11 is a plane view of an optical fiber fusion-splicing system according to a third exemplary embodiment of the present invention in a state where a windshield cover is open.

As shown in FIG. 11, the optical fiber fusion-splicing system 1 includes a system main body 7, an optical fiber butting section 11, discharge electrodes 13, 13, a hinge portion 14, a windshield cover 15, the optical fiber fixing system 17, 17 (or 33, 33) and a monitor (not shown).

Figure 12:
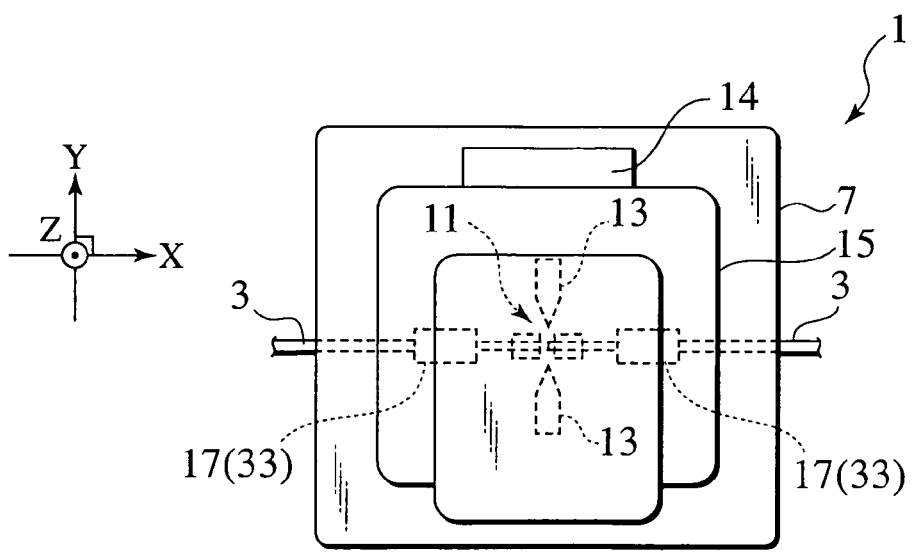
FIG. 12 is a plane view of an optical fiber fusion-splicing system according to the third exemplary embodiment of the present invention in a state where a windshield cover is shut.

Clamp bases (not shown) of the optical fiber fixing systems 17, 17 (or 33, 33) are disposed respectively along the X-axis at the equal distances from the butting section 11. The optical fiber fixing systems 17, 17 (or 33, 33) fix optical fibers 3, 3 respectively. The discharge electrodes 13, 13 are disposed respectively along the Y-axis at the equal distances from the butting section 11. The discharge electrodes 13, 13 are used for fusing the end surfaces of the optical fibers 3, 3. The windshield cover 15 being positioned on the upper portion (+Z side), as shown in FIG. 12, protects the butting section 11 from a blow, etc. The windshield cover 15 can be opened and shut around the hinge portion 14 attached to the +Y side portion of the system main body 7. The monitor is disposed on the side of the system main body 7. An operator can watch a process of fusing by the discharge electrodes 13, 13 using the monitor.

An operation of the optical fiber fusion-splicing system 1 will be described.

In a state where the windshield cover 15 is open, the optical fibers 3, 3 are set in along V-grooves of the clamp bases and also at the butting section 11 of the optical fiber fixing system 17, 17 (or 33, 33). Then, the windshield cover 15 is shut over the system main body 7, and following that movement, clamp members of the optical fiber fixing systems 17, 17 (or 33, 33) go down to fix the optical fibers 3, 3 on the clamp base. After the windshield cover 15 is shut, the butting section 11 makes optical axes of the optical fibers 3, 3 aligned to butt end surfaces of the optical fibers 3, 3. After butting the end surfaces of the optical fibers 3, 3, the end surfaces of the optical fibers 3, 3 are melted with the discharge electrodes 13,13 in order to be fusion-spliced.

Fourth Exemplary Embodiment

In this embodiment, an optical fiber butting system 16 employing an optical fiber fixing system 17 or an optical fiber fixing system 33 will be described.

Figure 13:
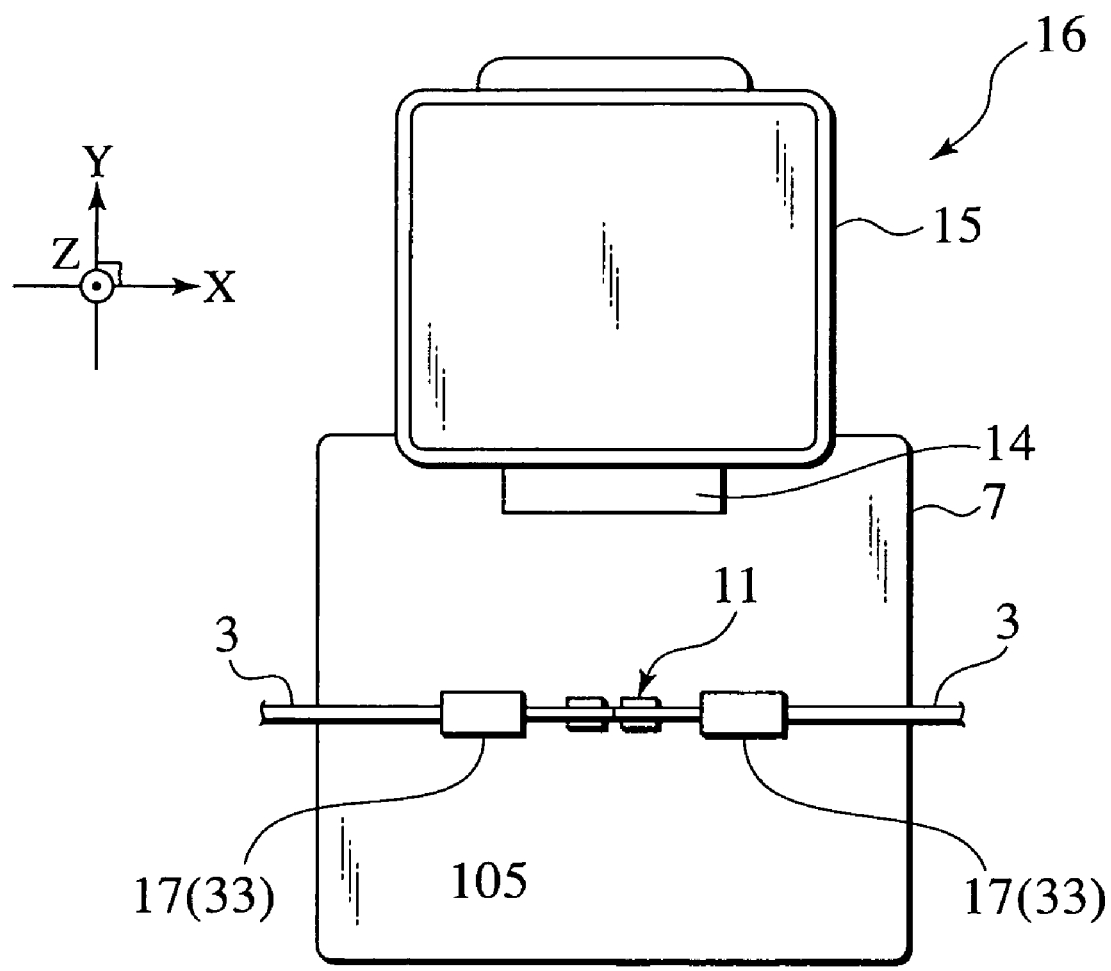
FIG. 13 is a plane view of an optical fiber butting system according to a fourth exemplary embodiment of the present invention.

As shown in FIG. 13, the optical fiber butting system 16 includes a system main body 7, a butting section 11, a hinge portion 14, a windshield cover 15, the optical fiber fixing system 17, 17 (or 33, 33) and a monitor (not shown).

The butting section 11 makes both optical axes of optical fibers 3, 3 aligned with each other. Clamp bases of the optical fiber fixing systems 17, 17 (or 33, 33) are disposed respectively along the X-axis at the equal distances from the butting section 11. The optical fiber fixing systems 17, 17 (or 33, 33) fix the optical fibers 3, 3 respectively. The windshield cover 15 being positioned on the upper portion (+Z side) protects the butting section 11 from a blow, etc. The windshield cover 15 can be opened and shut around the hinge portion 14 attached to the +Y side portion of the system main body 7. The monitor is disposed on the side of the system main body 7. An operator can watch a butted state of the optical fibers 3, 3.

An operation of the optical fiber butting system 16 will be described.

In a state where the windshield cover 15 is open, the optical fibers 3, 3 are set in along V-grooves of the clamp bases and also at the butting section 11 of the optical fiber fixing system 17, 17 (or 33, 33). Then, the windshield cover 15 is shut over the system main body 7, and following that movement, clamp members of the optical fiber fixing systems 17, 17 (or 33, 33) go down to fix the optical fibers 3, 3 on the clamp base. After the windshield cover 15 is shut, the butting section 11 makes optical axes of the optical fibers 3, 3 aligned to butt end surfaces of the optical fibers 3, 3.

Although exemplary embodiments of the present invention have been described with reference to the drawings, the present invention is not limited by the embodiments and the drawings. It will be apparent that those skilled in the art can make various modifications and changes within the technical spirit and scope of the invention.

What is claimed is:

1. An optical fiber fixing system for fixing an optical fiber comprising:
    a fixing body comprising a first groove, formed in a first surface thereof, extending in a first direction to support the optical fiber along its axial direction and a second groove, formed in a second surface thereof, shaped to support the optical fiber, wherein the second groove extends in the first direction laterally adjacent to the first groove so that both the first and second grooves can axially support the optical fiber simultaneously, and the seconds surface of the fixing body is arranged above, and laterally adjacent to, the first surface of the fixing body to form a stepped structure; and
    a pressing body comprising a protrusion, formed on a first surface thereof, a longer part of the protrusion extending in a lateral direction, wherein said lateral direction is substantially perpendicular to the direction of the first groove, and
    wherein the first surface of the pressing body faces the first surface of the fixing body.

2. The optical fiber fixing system according to claim 1, wherein the first surface of the pressing body and the first surface of the fixing body are substantially planar.

3. The optical fiber fixing system according to claim 1, wherein, when the optical fiber is supported in the first groove, a ridgeline of the optical fiber protrudes out of the first groove above the first surface of the fixing body.

4. The optical fiber fixing system according to claim 1, wherein the cross section of the first groove is V-shaped.

5. The optical fiber fixing system according to claim 1, wherein the cross section of the first groove is trapezoidally-shaped.

6. The optical fiber fixing system according to claim 1, wherein the first surface of the pressing body and the first surface of the fixing body are substantially planar.

7. The optical fiber fixing system according to claim 1, wherein, when the optical fiber is supported in the second groove, the ridgeline of the optical fiber is contained within the second groove below the second surface of the fixing body.

8. The optical fiber fixing system according to claim 1, wherein the first groove is shorter than the second groove when measured in the first direction.

9. The optical fiber fixing system according to claim 1, wherein the cross section of the second groove is V-shaped.

10. The optical fiber fixing system according to claim 1, wherein the cross section of the second groove is trapezoidally-shaped.

11. The optical fiber fixing system according to claim 1, wherein the cross section of the protrusion is semi-cylindrical and the protrusion is formed integrally with the pressing body.

12. The optical fiber fixing system according to claim 11, wherein the integrally formed protrusion and pressing body is formed of a metal material.

13. The optical fiber fixing system according to claim 11, wherein the integrally formed protrusion and pressing body is formed of a ceramic material.

14. The optical fiber fixing system according to claim 1, wherein the cross section of the protrusion is prismatic and the protrusion is formed integrally with the pressing body.

15. The optical fiber fixing system according to claim 14, wherein the integrally formed protrusion and pressing body is formed of a metal material.

16. The optical fiber fixing system according to claim 14, wherein the integrally formed protrusion and pressing body is formed of a ceramic material.

17. The optical fiber fixing system according to claim 1, wherein the protrusion is formed of a material different from that of the pressing body, and is arranged in a protrusion mounting groove formed in the first surface of the pressing body.

18. The optical fiber fixing system according to claim 17, wherein the pressing body is formed of a resin.

19. The optical fiber fixing system according to claim 17, wherein the protrusion is formed of a metal material.

20. The optical fiber fixing system according to claim 17, wherein the protrusion is formed of a ceramic material.

21. The optical fiber fixing system according to claim 17, wherein the cross section of the protrusion is cylindrical.

22. The optical fiber fixing system according to claim 21, wherein the protrusion is formed of a metal material.

23. The optical fiber fixing system according to claim 21, wherein the protrusion is formed of a ceramic material.

24. The optical fiber fixing system according to claim 17, wherein the cross section of the protrusion is prismatic and the protrusion is formed integrally with the pressing body.

25. The optical fiber fixing system according to claim 24, wherein the protrusion is formed of a metal material.

26. The optical fiber fixing system according to claim 24, wherein the protrusion is formed of a ceramic material.

27. The optical fiber fixing system according to claim 1, wherein:
the pressing body further comprises a guide portion extending longitudinally from the first surface thereof;
the guide portion faces the second surface of the fixing body and is formed of sloped portions configured to interface with the second groove to align the optical fiber therein.

28. The optical fiber fixing system according to claim 1, wherein at least one of the fixing body and pressing body is movable towards the other fixing the optical fiber therebetween by the protrusion pressing the optical fiber against the first groove.

29. An optical fiber butting system, which is provided with a pair of optical fiber fixing systems as recited in claim 1, for respectively fixing a pair of optical fibers set up at an equal distance from a buffing section, for butting the optical fibers fixed to the optical fiber fixing systems.

30. An optical fiber fusion-splicing system, which is provided with a pair of optical fiber fixing systems as recited in claim 1, for respectively fixing a pair of optical fibers set up at an equal distance from a butting section by fusion-splicing the optical fibers fixed to the optical fiber fixing systems.

31. The optical fiber fixing system according to claim 3, wherein the protrusion is arranged to press against the ridgeline of the optical fiber when the optical fiber is supported in the first groove.

32. The optical fiber fixing system according to claim 27, wherein the sloped portions of the guide portions protrude into the second groove to align the optical fiber therein.

33. An optical fiber fixing system for fixing an optical fiber comprising:
a fixing body comprising a first groove formed in a first surface thereof, and a second groove formed in a second surface thereof, wherein the first surface lies in a plane parallel to a plane of the second surface, and both grooves extend in a direction to support the optical fiber along its axial direction; and
a pressing body comprising a planar clamp portion facing the first surface of the fixing body, and a guide portion facing the second surface of the fixing body and comprising two sloped portions configured to interface with the second groove to align the optical fiber therein,
wherein the planar clamp portion is in contact with a portion of the optical fiber that is arranged in the first groove.

34. The optical fiber fixing system according to claim 33, wherein the second surface of the fixing body is arranged above, and laterally adjacent to, the first surface of the fixing body to form a stepped structure.

35. The optical fiber fixing system according to claim 33, wherein the guide portion further comprises a bottom surface arranged between the two sloped portions.

36. The optical fiber fixing system according to claim 35, wherein, when the fixing body and pressing body are arranged adjacently to fix the optical fiber therebetween, the bottom surface of the guide portion is located above a ridgeline of the optical fiber supported in the second groove.

37. The optical fiber fixing system according to claim 33, wherein, when the optical fiber is supported in the first and second grooves, a ridgeline of the optical fiber protrudes out of the first groove above the first surface of the fixing body, and is contained within the second groove below the second surface of the fixing body.

38. The optical fiber fixing system according to claim 33, wherein the first surface of the pressing body and the first surface of the fixing body are substantially planar.

39. The optical fiber fixing system according to claim 33, wherein the cross sections of the first and second grooves are V-shaped.

40. The optical fiber fixing system according to claim 33, wherein the cross sections of the first and second grooves are trapezoidally-shaped.

41. The optical fiber fixing system according to claim 33, wherein the first groove is shorter than the second groove when measured in the axial direction.

42. The optical fiber fixing system according to claim 33, wherein the pressing body is formed of a metal material.

43. The optical fiber fixing system according to claim 33, wherein the pressing body is formed of a ceramic material.

44. The optical fiber fixing system according to claim 33, wherein at least one of the fixing body and pressing body is movable towards the other fixing the optical fiber therebetween.

45. An optical fiber buffing system, which is provided with a pair of optical fiber fixing systems as recited in claim 33, for respectively fixing a pair of optical fibers set up at an equal distance from a buffing section, for butting the optical fibers fixed to the optical fiber fixing systems.

46. An optical fiber fusion-splicing system, which is provided with a pair of optical fiber fixing systems as recited in claim 33, for respectively fixing a pair of optical fibers set up at an equal distance from a buffing section by fusion-splicing the optical fibers fixed to the optical fiber fixing systems.

47. The optical fiber fixing system according to claim 37, wherein: the planar clamp portion of the pressing body comprises a protrusion extending substantially perpendicularly to the first groove; and the protrusion is arranged to press against the ridgeline of the optical fiber when the optical fiber is supported in the first groove.

48. The optical fiber fixing system according to claim 33, wherein the sloped portions of the guide portions protrude into the second groove to align the optical fiber therein.

49. The optical fiber fixing system according to claim 33, wherein the optical fiber is positioned within the first and second groove of the fixing body.

* * * * *